United States Patent
Ma et al.

(10) Patent No.: US 12,067,658 B1
(45) Date of Patent: Aug. 20, 2024

(54) METHOD, APPARATUS AND DEVICE FOR AUTOMATICALLY MAKING UP PORTRAIT LIPS, STORAGE MEDIUM AND PROGRAM PRODUCT

(71) Applicants: MIGU VIDEO CO., LTD, Shanghai (CN); Migu Co., Ltd, Bejing (CN); China Mobile Communications Group Co., Ltd., Beijing (CN)

(72) Inventors: Xiao Ma, Shanghai (CN); Wangdu Chen, Shanghai (CN); Qi Wang, Shanghai (CN); Xinghao Pan, Shanghai (CN); Kangjing Li, Shanghai (CN)

(73) Assignees: MIGU VIDEO CO., LTD, Shanghai (CN); Migu Co., Ltd., Beijing (CN); China Mobile Communications Group Co., Ltd., Beijing (CN)

( * ) Notice: Subject to any disclaimer, the term of this patent is extended or adjusted under 35 U.S.C. 154(b) by 0 days.

(21) Appl. No.: 18/573,093

(22) PCT Filed: Aug. 25, 2022

(86) PCT No.: PCT/CN2022/114755
§ 371 (c)(1),
(2) Date: Dec. 21, 2023

(87) PCT Pub. No.: WO2023/025239
PCT Pub. Date: Mar. 2, 2023

(30) Foreign Application Priority Data

Aug. 25, 2021 (CN) .......................... 202110982907.2

(51) Int. Cl.
*G06T 11/00* (2006.01)
*G01J 3/46* (2006.01)
(Continued)

(52) U.S. Cl.
CPC ................ *G06T 11/60* (2013.01); *G06T 7/13* (2017.01); *G06T 7/50* (2017.01); *G06T 7/73* (2017.01);
(Continued)

(58) Field of Classification Search
None
See application file for complete search history.

(56) References Cited

U.S. PATENT DOCUMENTS

| | | | | |
|---|---|---|---|---|
| 2007/0071289 | A1* | 3/2007 | Takeguchi | ........... G06V 40/171 382/118 |
| 2012/0223952 | A1* | 9/2012 | Kanemaru | .............. G06T 13/40 345/473 |

(Continued)

FOREIGN PATENT DOCUMENTS

| | | |
|---|---|---|
| CN | 108804975 A | 11/2018 |
| CN | 110136698 A | 8/2019 |

(Continued)

*Primary Examiner* — Joni Hsu
(74) *Attorney, Agent, or Firm* — Price Heneveld, LLP

(57) ABSTRACT

Embodiments of the present disclosure provide a method, apparatus and device for automatically making up portrait lips, storage medium and program product. The method includes: extracting lip key points from a portrait facial image and detecting a portrait facial orientation and a lip shape in the portrait facial image; adjusting positions of the lip key points based on the portrait facial orientation and the lip shape; detecting a skin hue and a skin color number of a facial area in the portrait facial image; and selecting a target lipstick color from a lipstick color sample library based on the skin hue and the skin color number; and performing fusion coloring by using the target lipstick color according to the positions of the lip key points.

5 Claims, 4 Drawing Sheets

(51) Int. Cl.
*G01J 3/52* (2006.01)
*G06T 7/13* (2017.01)
*G06T 7/50* (2017.01)
*G06T 7/73* (2017.01)
*G06T 7/90* (2017.01)
*G06T 11/60* (2006.01)
*G06V 10/56* (2022.01)
*G06V 40/16* (2022.01)

(52) U.S. Cl.
CPC .............. *G06T 7/90* (2017.01); *G06T 11/001* (2013.01); *G06V 10/56* (2022.01); *G06V 40/171* (2022.01); *G01J 3/463* (2013.01); *G01J 3/526* (2013.01); *G06V 40/161* (2022.01)

(56) References Cited

U.S. PATENT DOCUMENTS

| | | | |
|---|---|---|---|
| 2013/0300761 A1* | 11/2013 | Ahmed | G09G 5/02 345/595 |
| 2018/0315336 A1 | 11/2018 | Shen et al. | |
| 2020/0051298 A1* | 2/2020 | Nguyen | G06T 1/00 |

FOREIGN PATENT DOCUMENTS

| | | | |
|---|---|---|---|
| CN | 112017212 | A | 12/2020 |
| CN | 112686820 | A | 4/2021 |
| CN | 113674177 | A | 11/2021 |
| JP | H08202754 | A | 8/1996 |
| JP | 2006120005 | A | 5/2006 |
| JP | 2007097950 | A | 4/2007 |
| JP | 2009163465 | A | 7/2009 |
| WO | 2017107957 | A1 | 6/2017 |

\* cited by examiner

METHOD, APPARATUS AND DEVICE FOR AUTOMATICALLY MAKING UP PORTRAIT LIPS, STORAGE MEDIUM AND PROGRAM PRODUCT

This application is the U.S. national phase of PCT Application PCT/CN2022/114755 filed on Aug. 25, 2022, which claims a priority of the Chinese patent application No. 202110982907.2 filed on Aug. 25, 2021, and entitled "method, apparatus and device for automatically making up portrait lips, storage medium and program product", which is incorporated herein by reference in its entirety.

CROSS-REFERENCE TO RELATED APPLICATION

This application claims a priority of the Chinese patent application No. 202110982907.2 filed on Aug. 25, 2021, and entitled "method, apparatus and device for automatically making up portrait lips, storage medium and program product", which is incorporated herein by reference in its entirety.

TECHNICAL FIELD

The present disclosure relates to the field of audio, video and image processing, in particular to a method, apparatus and device for automatically making up portrait lips, storage medium and program product.

BACKGROUND

With development of image processing technology in an intelligent terminal, after collecting portrait information through a camera, the intelligent terminal can automatically make up a collected portrait according to a user's selection. This function is widely used in the photography and video shooting applications of the intelligent terminal itself, as well as in processing of real-time collected portraits during internet live broadcasting. When making up a lip, a lip contour is first determined through the portrait, and then the lip is colored according to a lipstick color number selected by the user.

However, during video shooting or internet live broadcasting, the portraits, especially facial areas, are almost always in dynamical change. When making up lips in the related art, curve fitting and coloring are performed based on key points marked by face detection, without adjusting positions of the key points. This causes positions of key points of the lips and lip corners to be inaccurate and inconsistent with actual positions when the light or face angle changes, which has a great impact on the makeup effect.

SUMMARY

In view of the foregoing problems, a method, apparatus and device for automatically making up portrait lips, storage medium and program product of embodiments of the present disclosure are proposed.

In a first aspect, one embodiment of the present disclosure provides a method for automatically making up portrait lips, including:
 extracting lip key points from a portrait facial image and detecting a portrait facial orientation and a lip shape in the portrait facial image; adjusting positions of the lip key points based on the portrait facial orientation and the lip shape;
 detecting a skin hue and a skin color number of a facial area in the portrait facial image; and selecting a target lipstick color from a lipstick color sample library based on the skin hue and the skin color number; and,
 performing fusion coloring by using the target lipstick color according to the positions of the lip key points.

In a possible implementation, the extracting lip key points from a portrait facial image, includes:
 identifying a facial contour and facial features in the portrait facial image, setting key points for the portrait facial image, and extracting the lip key points from all the key points; wherein the lip key points are used to describe lip image information.

In a possible implementation, before adjusting positions of the lip key points based on the portrait facial orientation and the lip shape, the method further includes:
 determining whether to adjust the positions of the lip key points based on the lip shape and lip corner key points among the lip key points.

In a possible implementation, the determining whether to adjust the positions of the lip key points based on the lip shape and lip corner key points among the lip key points, includes:
 when the lip shape is closed or a degree of mouth opening is less than a first preset degree threshold, if the lip corner key points do not meet a first preset condition, adjusting the positions of the lip key points; wherein the first preset condition is that in a grayscale color space, lightness of pixel points in a middle of the lip corner key points is lower than a first preset threshold;
 when the lip shape is open and a degree of mouth opening is larger than a second preset degree threshold, if the lip corner key points do not meet a second preset condition, adjusting the positions of the lip key points; wherein the first preset degree threshold is less than or equal to the second preset degree threshold, and the second preset condition is that the lip corner key points are near an edge of a lip area and are not simultaneously located within a skin color area or a lip color area.

In a possible implementation, the adjusting positions of the lip key points based on the portrait facial orientation and the lip shape, includes:
 for side lip corner key points in the lip key points, when the portrait facial orientation is front-facing and the lip shape is closed, finding two darkest pixel points in a front-facing adjustment area, and taking a middle position between the two pixel points as an adjusted position of the side lip corner key points; wherein the front-facing adjustment area is an area formed by extending a first preset number of pixel points around positions of the side lip corner key points;
 when the portrait facial orientation is front-facing and the lip shape is open, performing edge detection on the front-facing adjustment area, and determining a first reference point according to a first edge detection result; by taking the first reference point as a center, finding a first skin color boundary point and a first lip color boundary point in a skin color area and a lip color area; and taking a middle position between the first skin color boundary point and the first lip color boundary point as an adjusted position of the side lip corner key points;
 when the portrait facial orientation is left-leaning or right-leaning and the lip shape is closed, finding a darkest pixel point in a side-leaning adjustment area and adjusting positions of the side lip corner key points according to a relative position of the darkest pixel in the side-leaning adjustment area; wherein the side-leaning adjustment area is an area formed by extending a second preset number of pixel points in left-right directions and a third preset number of pixel points in up-down directions from the positions of the side lip corner key points;

when the portrait facial orientation is left-leaning or right-leaning and the lip shape is open, finding a darkest pixel point in the side-leaning adjustment area, performing edge detection on the side-leaning adjustment area, and determining a second reference point according to a second edge detection result; by taking the second reference point as a center, finding a second skin color boundary point and a second lip color boundary point in a skin color area and a lip color area, and adjusting positions of the side lip corner key points according to a relative position of the darkest pixel point in the side-leaning adjustment area, the second skin color boundary point and the second lip color boundary point.

In a possible implementation, the detecting a skin hue and a skin color number of a facial area in the portrait facial image, includes:

calculating a corresponding skin hue judgment coefficient based on color parameters of the facial area in the portrait facial image; determining the skin hue to be cool when the skin hue judgment coefficient is within a first preset interval; determining the skin hue to be warm when the skin hue judgment coefficient is within a second preset interval; and determining the skin hue to be neutral when the skin hue judgment coefficient is not within the first preset interval and not within the second preset interval;

calculating a corresponding skin color number judgment coefficient based on the color parameters of the facial area in the portrait facial image; and determining the skin color number of the facial area based on the skin color number judgment coefficient.

In a possible implementation, the selecting a target lipstick color from a lipstick color sample library based on the skin hue and the skin color number, includes:

dividing all lipstick colors in the lipstick color sample library into intervals according to a preset color matching coefficient, and configuring a correspondence between each lipstick color interval and a preset skin hue;

finding a target lipstick color interval corresponding to the skin hue of the facial area based on the correspondence between each lipstick color interval and the preset skin hue; and selecting a corresponding lipstick color number in the target lipstick color interval based on the skin color number of the facial area.

In a second aspect, one embodiment of the present disclosure provides an apparatus for automatically making up portrait lips, including: a key point determination module, a color selection module, and a fusion coloring module;

wherein the key point determination module is configured to extract lip key points from a portrait facial image, detect a portrait facial orientation and lip shape in the portrait facial image, and adjust positions of the lip key points based on the portrait facial orientation and the lip shape;

the color selection module is configured to detect a skin hue and a skin color number of a facial area in the portrait facial image, and select a target lipstick color from a lipstick color sample library based on the skin hue and the skin color number;

the fusion coloring module is configured to perform fusion coloring by using the target lipstick color according to the positions of the lip key points.

In a third aspect, one embodiment of the present disclosure provides a computing device, including: a processor, a memory, a communication interface, and a communication bus; wherein the processor, the memory, and the communication interface communicate with each other through the communication bus;

the memory is configured to store an executable instruction that causes the processor to perform the steps of the foregoing method for automatically making up portrait lips.

In a fourth aspect, one embodiment of the present disclosure provides a computer storage medium, including an executable instruction stored thereon; wherein the executable instruction, when executed by a processor, causes the processor to perform the steps of the foregoing method for automatically making up portrait lips.

In a fifth aspect, one embodiment of the present disclosure provides a computer program product, including computer readable codes, wherein the computer readable codes, when executed on an electronic device, cause a processor in the electronic device to perform the steps of the foregoing method for automatically making up portrait lips.

According to the technical solution provided by the embodiments of the present disclosure, by extracting lip key points from a portrait facial image and adjusting positions of the lip key points based on the detected portrait facial orientation and lip shape, the accuracy of the adjusted lip key points is ensured. Then, according to the detected skin hue and skin color number of the facial image, a suitable lipstick color is automatically selected and colored. This solves the problem of inaccurate key point position and makeup defects in the related art when the lighting and angle of the portrait change, which is based on curve fitting and coloring according to the facial detection key points. Meanwhile, the user's operation of choosing lipstick color by themselves is saved. Automatically selecting lipstick color and coloring according to the corresponding conditions is more in line with human aesthetics and improves the efficiency of makeup and user experience.

Described above is merely an overview of the technical solutions of the embodiments of the present disclosure. In order to understand the technical solution of the embodiments of the present disclosure more clearly so as to implement the embodiments of the present disclosure in accordance with the contents of specification, and to make the aforementioned and other features and advantages of the present disclosure more apparent, detailed description of the embodiments of the present disclosure are provided hereinafter.

BRIEF DESCRIPTION OF THE DRAWINGS

With detailed description of the following embodiments, various other advantages and benefits will become apparent to an ordinary person skilled in the art. Accompanying drawings are merely for the purpose of illustrating the embodiments and should not be considered as limiting of the present disclosure. Furthermore, throughout the drawings, same elements are indicated by same reference signs. In the drawings.

DETAILED DESCRIPTION

The exemplary embodiments of the disclosure will be described in more details hereinafter with reference to the accompanying drawings. Although the accompanying drawings illustrate the exemplary embodiments of the disclosure, it is to be understood that the disclosure may be implemented in various forms but not limited by the embodiments set forth herein. Instead, these embodiments are provided to make the present disclosure be understood more thoroughly, and completely convey the scope of the present disclosure to those skilled in the art.

Figure 1A:
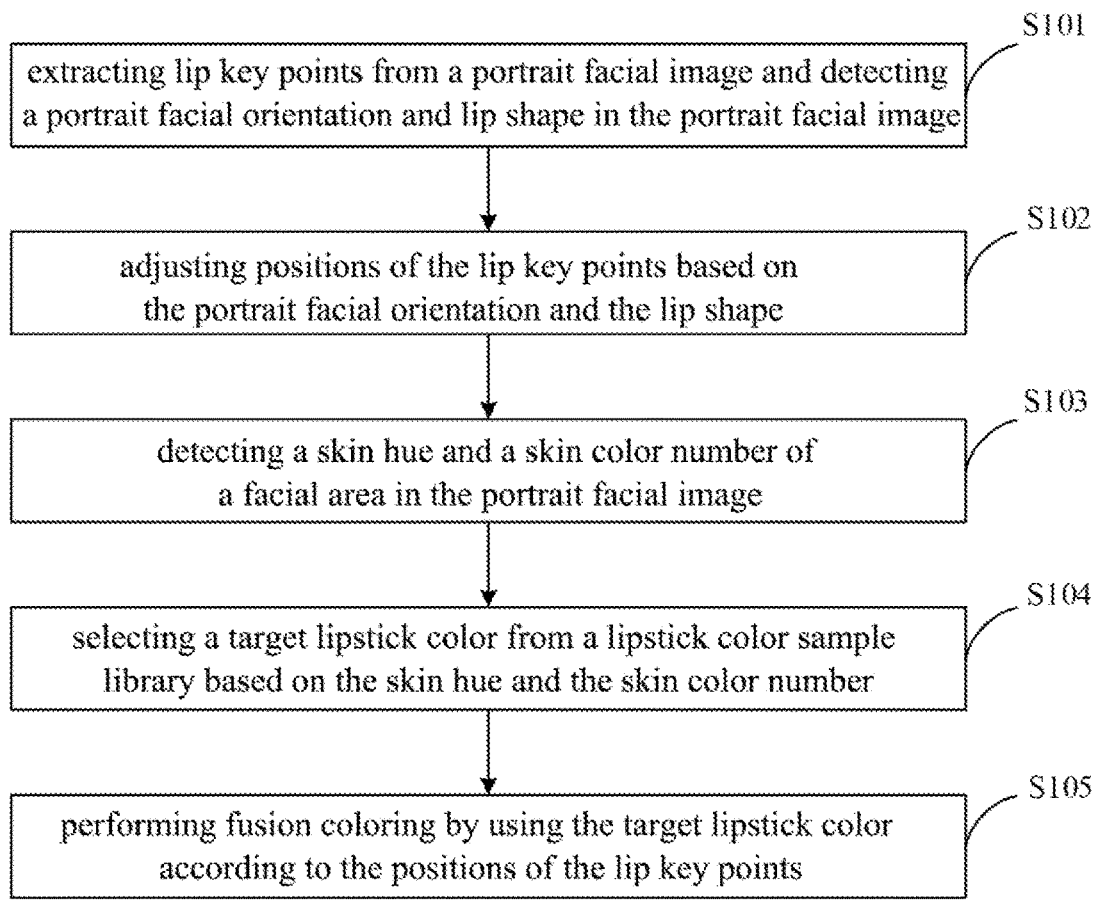
FIG. 1a is a schematic flowchart of a method for automatically making up portrait lips according to an embodiment of the present disclosure.

FIG. 1a is a schematic flowchart of a method for automatically making up portrait lips according to an embodiment of the present disclosure. As shown in FIG. 1a, the method includes the following steps:

Step S101: extracting lip key points from a portrait facial image and detecting a portrait facial orientation and a lip shape in the portrait facial image.

In some embodiments, the extracting lip key points from a portrait facial image, includes:

identifying a facial contour and facial features in the portrait facial image, setting key points for the portrait facial image, and extracting the lip key points from all the key points; where the lip key points are used to describe lip image information.

Figures 1B, 2:
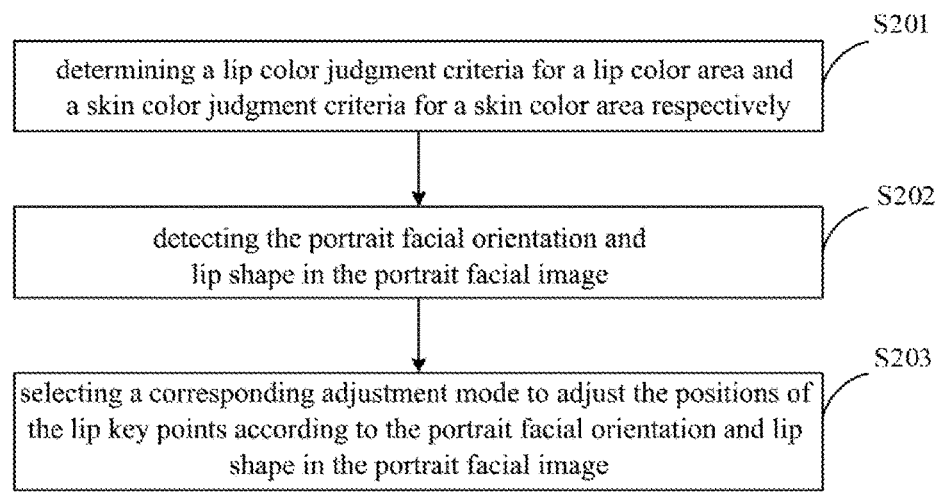
FIG. 1b is a schematic view showing key points in a portrait facial image according to an embodiment of the present disclosure.
FIG. 2 is a schematic flowchart of adjusting positions of lip key points in a method for automatically making up portrait lips according to an embodiment of the present disclosure.

FIG. 1b is a schematic view showing key points in a portrait facial image according to an embodiment of the present disclosure. After identifying the facial contour and facial features in the portrait facial image, key points set for the portrait facial image are shown in FIG. 1b. FIG. 1b is a schematic view of key points of a facial image according to an embodiment of the present disclosure. In the following, 68 standard key points in FIG. 1b are taken as an example to illustrate the method for automatically making up portrait lips in an embodiment of the present disclosure.

Among all the key points shown in FIG. 1b, the key points 49, 55, 51, 53, and 58 are used as boundaries, and 20 pixels are extended outward as the lip area. The key points 49 to 68 are lip key points and used to describe lip image information.

In some embodiments, the detecting a portrait facial orientation and a lip shape in the portrait facial image, includes:

in case that the facial orientation includes: front-facing, left-leaning, and right-leaning; the lip shape includes: open mouth and unopened mouth;

extracting, from the lip key points 49 to 68, left lip key points, right lip key points corresponding to the left lip key points, upper lip key points and lower lip key points corresponding to the upper lip key points;

where the left lip key points are lip key points at a left side of a vertical midline of the face, and include: key points 49, 50, 51, 59, 60, 61, 62, 68; the right lip key points are lip key points at a right side of the vertical midline of the face, and include: key points 53, 54, 55, 56, 57, 64, 65, 66. In addition, taking the vertical midline of the face as an axis of symmetry, left and right lip key points that are symmetrical to each other are the corresponding left and right lip key points; for example, the left lip key point 50 is symmetrical to the right lip key point 54 with the midline of the face as the axis of symmetry, that is, the left lip key point 50 is corresponding to the right lip key point 54; the upper lip key points are lip key points at an upper side of a horizontal midline of the lip except for the left and right lip key points, and include: key points 52 and 63; the lower lip key points are lip key points at a lower side of the horizontal midline of the lips except for the left and right lip key points, and include: key points 58 and 67; in addition, taking the horizontal midline of the lips as the axis of symmetry, the upper and lower lip key points that are symmetrical to each other are the corresponding upper and lower lip key points, for example, the upper lip key point 52 is corresponding to the lower lip key point 58;

calculating a first position difference of the left lip key points in an x-axis direction, a second position difference of the right lip key points in the x-axis direction, and a third position difference of the upper lip key points and the lower lip key points in a y-axis direction;

where the calculating the first position difference requires extracting any two key points from the left lip key points, and a position difference of the two extracted key points in the x-axis direction is the first position difference; for example, the lip key points 49 and 50 are extracted from the left lip key points, the first position difference is a position difference of the lip key points 49 and 50 in the x-axis direction;

where the calculating the second position difference requires extracting two key points corresponding to the two extracted left lip key points from the right lip key points, and the position difference of the two extracted key points in the x-axis direction is the second position difference; for example, the lip key points 49 and 50 are extracted from the left lip key points, then the corresponding lip key points 55 and 54 are extracted from the right lip key points, and the second position difference is a position difference of the lip key points 55 and 54 in the x-axis direction;

where the calculating the third position difference requires extracting an upper lip key point and a corresponding lower lip key point, and a position difference of the two extracted key points in the y-axis direction is the third position difference; for example, the key point 63 is extracted from the upper lip key points, then the key point 67 is extracted from the lower lip key points, and the third position difference is a position difference of the lip key points 63 and 67 in the y-axis direction;

determining the portrait facial orientation according to a width, a height and an image resolution of the facial area in the portrait facial image, the first position difference and second position difference; where the portrait facial orientation includes front-facing, left-leaning, and right-leaning; and determining the lip shape according to the width, the height and the image resolution of the facial area in the portrait facial image, and the third position difference.

In some embodiments, one way for determining the facial orientation may include:

assuming: $d_1 = P51._x - P50._x$, $d_2 = P54._x - P53._x$, $$\delta_x = \frac{R_w R_h}{WH}(P52._x - P51._x),$$

where $d_1$ is a position difference of the key points 51 and 50 in the x-axis direction, i.e., the first position difference; $d_2$ is a position difference of the key points 54 and 53 in the x-axis direction, i.e., the second position difference; $R_w$ is a width of the facial area, $R_h$ is a height of the facial area, WH is an image resolution, $P52._x - P51._x$ is a position difference of the key points 52 and 51 in the x-axis direction;

if $d_1 - d_2 > \delta_x$, determining that the facial orientation is the right-leaning; if $d_2 - d_1 > \delta$, determining that the facial orientation is the left-leaning; otherwise, determining that the facial orientation is the front-facing.

One way for determining the lip shape may include: assuming:

$$\text{open}_y = P67._y - P63._y, \delta_y = \frac{R_w R_h}{WH}(P58._y - P67._y),$$

where $\text{open}_y$ is a position difference of the key points 67 and 63 in the y-axis direction, i.e., the third position difference; $P58._y - P67._y$ is the position difference of the key points 67 and 58 in the y-axis direction; in addition, it is assumed that a first preset degree threshold $Y_1$ is set, a second preset degree threshold $Y_2$ is set, and $Y_2 > Y_1$;

if $\text{open}_y > \delta_y$, determining that the lip shape is open mouth; if $\text{open}_y < \delta_y$, determining that the lip shape is closed;

when the lip shape is open mouth, if $\text{open}_y < Y_1$, determining that the lip shape is small degree of mouth opening, i.e., the degree of mouth opening is less than the first preset degree threshold; if $\text{open}_y > Y_2$, determining that the lip shape is large degree of mouth opening, i.e., the degree of mouth opening is larger than the second preset degree threshold.

Step S102: adjusting positions of the lip key points based on the portrait facial orientation and the lip shape.

In some embodiments, before the adjusting the positions of the lip key points based on the portrait facial orientation and the lip shape, the method further including:

determining whether to adjust the positions of the lip key points based on the lip shape and lip corner key points among the lip key points;

when the lip shape is closed or a degree of mouth opening is less than the first preset degree threshold, if the lip corner key points do not meet a first preset condition, adjusting the positions of the lip key points; where the first preset condition is that in a grayscale color space, lightness of pixel points in the middle of the lip corner key points is lower than a first preset threshold;

when the lip shape is open and a degree of mouth opening is larger than a second preset degree threshold, if the lip corner key points do not meet a second preset condition, adjusting the positions of the lip key points; where the first preset degree threshold is less than or equal to the second preset degree threshold, and the second preset condition is that the lip corner key points are near an edge of a lip area and are not simultaneously located within a skin color area or a lip color area.

In some embodiments, when the portrait does not open the mouth or the degree of mouth opening is relatively small, if the portrait does not change the orientation or the lip shape does not change, then a middle point of the two lip corner key points should be at a junction of the upper and lower lips. Compared to the surroundings, the middle point is in a recessed shadow area. Therefore, in the grayscale color space, if the lightness of the middle point is lower than the lightness of the surrounding macroblocks, it indicates that the middle point is in the shadow area, that is, it can be judged that the portrait does not change the orientation or the lip shape does not change. On the contrary, if the portrait changes the orientation or the lip shape changes, then the middle point is not in the shadow area. Thus, in the grayscale color space, the lightness of the middle point is not necessarily lower than the lightness of the surrounding macroblocks.

Therefore, the first preset condition may be that in the grayscale color space, the lightness of the pixel point in the middle of the lip corner key points is lower than a first preset threshold. Then, when the lip shape is a unopen mouth shape or the degree of opening is less than the first preset degree threshold, if in the grayscale color space, the lightness of the pixel point in the middle of the lip corner key points is not lower than the first preset threshold, then the positions of the lip key points are adjusted.

In some embodiments, the first preset threshold may be: the darkest 10% in the lip area.

In some embodiments, when the portrait opens the mouth normally or the degree of mouth opening is relatively large, if the portrait does not change the orientation or the lip shape does not change, two lip corner key points are near an edge of the surrounding macroblock. Meanwhile, the lip corner key points are merely located within the skin color area or the lip color area. Otherwise, if the portrait changes the orientation or the lip shape changes, the positions of the lip corner key points also change, that is, the lip corner key points are no longer at the edge of the surrounding macroblock; and the skin color area and lip color area where the lip corner key points are located, may overlap, so the positions of the lip corner key points needs to be adjusted.

Therefore, the second preset condition may be that the lip corner key points are near an edge of the lip area and are not simultaneously located within a skin color area or a lip color area. Then, when the lip shape is open mouth and the degree of mouth opening is larger than the second preset degree threshold, if the lip corner key points are near the edge of the lip area and are not simultaneously located within the skin color area and the lip color area, then the positions of the lip corner key points are not adjusted; where the first preset degree threshold is less than or equal to the second preset degree threshold.

Step S103: detecting a skin hue and a skin color number of a facial area in the portrait facial image.

In some embodiments, a corresponding skin hue judgment coefficient is calculated based on color parameters of the facial area in the portrait facial image. The skin hue of the facial area in the portrait facial image is determined based on the skin hue judgment coefficient. A corresponding skin color number judgment coefficient is calculated based on color parameters of the facial area in the portrait facial image. The skin color number of the facial area is determined based on the skin color number judgment coefficient.

Step S104: selecting a target lipstick color from a lipstick color sample library based on the skin hue and the skin color number.

In some embodiments, all lipstick colors in the lipstick color sample library are divided into intervals according to a preset color matching coefficient, and a correspondence is configured between each lipstick color interval and a preset skin hue.

A target lipstick color interval corresponding to the skin hue of the facial area is found based on the correspondence between each lipstick color interval and the preset skin hue.

A corresponding lipstick color number is selected in the target lipstick color interval based on the skin color number of the facial area.

In some embodiments, the preset color matching coefficient may be:

$$\Phi = \frac{\mu_L \eta_{level}}{\xi_{stone}(L_{max} - L_{min})};$$

where $\mu_L$ is a mean value of lightness L of the facial area in the Lab color space; $\xi_{stone}$ is the skin hue judgment coefficient of the facial area; $\eta_{level}$ is the skin color number judgment coefficient of the facial area; $L_{max}$ is the maximum value of the lightness L of the facial area in the Lab color space; $L_{min}$ is the minimum value of the lightness L of the facial area in the Lab color space.

The lipstick colors in the lipstick color sample library are divided into intervals according to the color matching coefficient (D, thereby obtaining lipstick color intervals of from blue hue to yellow hue.

Step S105: performing fusion coloring by using the target lipstick color according to the positions of the lip key points.

In some embodiments, based on the determined positions of the lip key points, the lip image information in the portrait facial image is accurately described, and fusion coloring is performed on the portrait lip based on the lip image information; where the color used for fusion coloring is the lipstick color corresponding to the lipstick color number determined in the step S104.

According to the method for automatically making up portrait lips in the present embodiment, the lip key points are extracted from the portrait facial image, and the portrait facial orientation and lip shape are detected, and the positions of the lip key points are adjusted. Meanwhile, the skin hue and skin color number of the facial area in the portrait facial image are detected, and the target lipstick color is selected from the lipstick color sample library. Finally, fusion coloring is performed on the portrait lip according to the positions of the lip key points and the selected lipstick color. By using the technical solution provided in the present disclosure, based on the lip key points extracted from the portrait facial image, the facial orientation and lip shape of the portrait can be detected and the positions of the lip key points in the portrait can be adjusted. And changes of the positions of the key points caused by different facial orientations and lip shapes are corrected, so that the adjusted positions of the key points conform to the current facial orientation and lip shape of the portrait. And a suitable lipstick color is automatically selected to perform the fusion coloring on the portrait lip based on the detected skin hue and skin color number. This effectively solves problems of inaccurate coloring position caused by the inability to adjust the key points when the facial orientation and lip shape change. And by automatically selecting the lipstick color, a user's operation steps are simplified, that is, makeup effect is optimized. Meanwhile, operation difficulty is reduced and user experience is effectively improved.

According to the foregoing method, FIG. 2 is a schematic flowchart of adjusting positions of lip key points in a method for automatically making up portrait lips according to an embodiment of the present disclosure. As shown in FIG. 2, the method includes the following steps:

Step S201: determining a lip color judgment criteria for a lip color area and a skin color judgment criteria for a skin color area respectively.

In some embodiments, the mean-variance ratio of a-b in the Lab color space is calculated in the lip color area as the lip color judgment criterion; in the cheek area, any area is found, and the mean-variance ratio of a-b in the Lab color space is calculated as the skin color judgment criterion.

In some embodiments, the lip color area is determined based on the key points 57, 58, 59, 66, 67, and 68.

Step S202: detecting a portrait facial orientation and a lip shape in the portrait facial image.

One way for detecting the portrait facial orientation and lip shape in the portrait facial image is described in detail in the step S101 of the aforementioned embodiment.

The facial orientation is divided into front-facing, left-leaning, and right-leaning; the lip shape is divided into: open mouth and unopened mouth.

Step S203: selecting a corresponding adjustment mode to adjust the positions of the lip key points according to the portrait facial orientation and lip shape in the portrait facial image.

In some embodiments, for the side lip corner key points in the lip key points:

when the portrait facial orientation is front-facing and the lip shape is unopened mouth, two darkest pixel points are found in one side front-facing adjustment area, and a middle position of the two pixel points is taken as an adjusted position of the side lip corner key points on that side; where the front-facing adjustment area is an area formed by extending a first preset number of pixel points around positions of the side lip corner key points. Since the portrait is in front-facing orientation and closed mouth shape, the darkest part in one side front-facing adjustment area is the lip corner part that is in shadow due to concavity, and the middle position of the two darkest pixel points can accurately determine the lip corner position on that side. Meanwhile, according to the positions of the side lip corner key points, expanding a first preset number of pixel points around to determine the front-facing adjustment area can determine an approximate position of the area based on the positions of the lip corner key points, and enough adjustment margin can be ensured while ensuring accuracy by presetting the expansion range.

In some embodiments, the first preset number can be 10, that is, an area formed by extending 10 pixel points around the position of the side lip corner key points is a front-facing adjustment area.

When the portrait facial orientation is front-facing and the lip shape is open mouth, edge detection on the front-facing adjustment area is performed, and a first reference point is determined according to a first edge detection result. Taking the first reference point as a center, a first skin color boundary point and a first lip color boundary point in a skin color area and a lip color area are found. And a middle position between the first skin color boundary point and the first lip color boundary point is taken as an adjusted position of the side lip corner key points. The first reference point in an original lip corner area is determined by the edge detection. And since the lip corner position is the boundary between skin color and lip color, the first skin color boundary point and the first lip color boundary point are determined based on the first reference point. The middle position of the first skin color boundary point and the first lip color boundary point can accurately represent the adjusted position of the side lip corner key points.

The first skin color boundary point is determined according to the skin color judgment criterion of the skin color area, and the first lip color boundary point is determined according to the lip color judgment criterion.

The side lip corner key points include: left lip corner key points and right lip corner key points, where the left lip corner key points can include the key points 49 and 61, and the right lip corner key points can include the key points 55 and 65. The adjustment of the side lip corner key points includes adjustment of the left lip corner key points and adjustment of the right lip corner key points.

In some embodiments, the edge detection of the front face adjustment area can be a Laplacian edge detection of a gray image on the front face adjustment area. For the adjustment of the left lip corner key points, a point closest to the key points 49 and 61 can be selected from the edge points in the first edge detection result as the first reference point. Similarly, for the adjustment of the right lip corner key points, a point closest to the key points 55 and 65 can be selected from the edge points in the first edge detection result as the first reference point.

When the portrait facial orientation is left-leaning or right-leaning and the lip shape is closed, the darkest pixel point in the side-leaning adjustment area is found, and positions of the side lip corner key points are adjusted according to a relative position of the darkest pixel in the side-leaning adjustment area; where the side-leaning adjustment area is an area formed by extending a second preset number of pixel points in left-right directions and a third preset number of pixel points in up-down directions from the positions of the side lip corner key points. Since the portrait facial orientation changes, when it is left-leaning, each key point also moves. By finding the darkest point and determining its position relationship with respect to the original lip corner key points, positions of the key points can be more accurately determined.

In some embodiments, positions of the side-leaning adjustment area can be divided into a left lip corner adjustment area and a right lip corner adjustment area. The left lip corner adjustment area is determined according to the left lip corner key points. The right lip corner adjustment area is determined according to the right lip corner key points. When determining the left lip corner adjustment area, the second preset number can be $P61._x-P49._x$, which is the number of pixels between the key point 61 and the key point 49; and the third preset number can be 10. When determining the right lip corner adjustment area, the second preset number can be $P65._x-P55._x$, which is the number of pixels between the key point 65 and the key point 55; and the third preset number can be 10.

That is, the left lip corner adjustment area is an area formed by extending $P61._x-P49._x$ pixels to the left from the key point 49, extending $P61._x-P49._x$ pixels to the right from the key point 61, and extending 10 pixels up and down from the key points 49 and 61. The right lip corner adjustment area is an area formed by extending $P65._x-P55._x$ pixels to the right from the key point 55, extending $P65._x-P55._x$ pixels to the left from the key point 65, and extending 10 pixels up and down from the key points 55 and 65.

When the portrait facial orientation is left-leaning or right-leaning and the lip shape is open mouth, a darkest pixel point in a side-leaning adjustment area is found, edge detection on the side-leaning adjustment area is performed, and a second reference point is determined according to a second edge detection result. Taking the second reference point as a center, a second skin color boundary point and a second lip color boundary point in a skin color area and a lip color area are found, and positions of the side lip corner key points are adjusted according to a relative position of the darkest pixel point in the side-leaning adjustment area, the second skin color boundary point and the second lip color boundary point. Since the portrait facial orientation changes and the lip shape is open, the darkest point on the edge is determined by edge detection based on the darkness of the lip corner. Then the adjusted positions of the lip corner key points are accurately determined based on the position relationship between the darkest point and the original lip corner key points, by using the darkest point and the skin color boundary point or the lip color boundary point.

The second skin color boundary point is determined according to the skin color judgment criterion of the skin color area, and the second lip color boundary point is determined according to the lip color judgment criterion.

In some embodiments, the edge detection of the side-leaning adjustment area can be a Laplacian edge detection of a gray image on the side-leaning adjustment area. For the adjustment of the left lip corner key points, a point closest to the key points 49 and 61 can be selected from the edge points in the second edge detection result as the second reference point. Similarly, for the adjustment of the right lip corner key points, a point closest to the key points 55 and 65 can be selected from the edge points in the second edge detection result as the second reference point.

In some embodiments, when the portrait facial orientation is left-leaning or right-leaning, the side-leaning adjustment area can be divided into a left lip corner adjustment area and a right lip corner adjustment area. The left lip corner adjustment area is determined according to the left lip corner key points, and the right lip corner adjustment area is determined according to the right lip corner key points. The left lip corner adjustment area is an area formed by extending $P61._x-P49._x$ pixels to the left from the key point 49, extending $P61._x-P49._x$ pixels to the right from the key point 61, and extending 10 pixels up and down from the key points 49 and 61. The right lip corner adjustment area is an area formed by extending $P65._x-P55._x$ pixels to the right from the key point 55, extending $P65._x-P55._x$ pixels to the left from the key point 65, and extending 10 pixels up and down from the key points 55 and 65.

When the portrait facial orientation is left-leaning, if the darkest pixel in the left lip corner adjustment area is between the key points 49 and 61, then the middle position between the key points 49 and 61 is taken as the adjusted position of the left lip corner key points. If the darkest pixel in the left lip corner adjustment area is at a left side of the key point 49, then the darkest point is extended to the left to the second skin color boundary point, and the middle position between the darkest point and the second skin color boundary point is taken as the adjusted position of the left lip corner key points. If the darkest pixel in the left lip corner adjustment area is at a right side of the key point 61, then the darkest point is extended to the right to the second lip color boundary point, and the middle position between the darkest point and the second lip color boundary point is taken as the adjusted position of the left lip corner key points.

If the darkest pixel in the right lip corner adjustment area is between the key points 55 and 65, then the middle position of the key points 55 and 65 is taken as the adjusted position of the right lip corner key points. If the darkest pixel in the right lip corner adjustment area is at a right side of the key point 55, then the darkest point is extended to the right to the second skin color boundary point, and the middle position of the darkest point and the second skin color boundary point is taken as the adjusted position of the right lip corner key points. If the darkest pixel in the right lip corner adjustment area is at the left side of the key point 65, then the darkest point is extended to the left to the second lip color boundary point, and the middle position of the darkest point and the second lip color boundary point is taken as the adjusted position of the right lip corner key points.

Similarly, when the portrait facial orientation is right-leaning, the adjusted positions for the left lip corner key points and the right lip corner key points are determined respectively.

Figure 3:
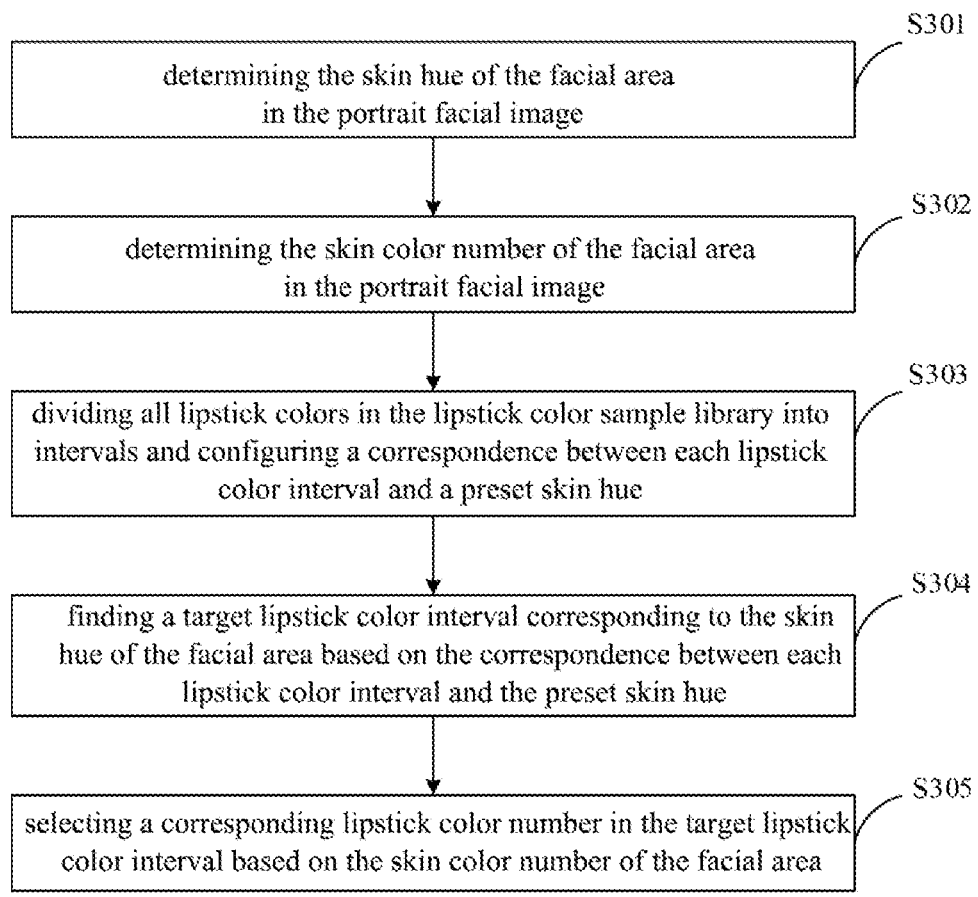
FIG. 3 is a schematic flowchart of automatically selecting a lipstick color in a method for automatically making up portrait lips according to an embodiment of the present disclosure.

According to the foregoing embodiments, FIG. 3 is a schematic flowchart of automatically selecting a lipstick color in a method for automatically making up portrait lips according to an embodiment of the present disclosure. As shown in FIG. 3, the method includes the following steps:

Step S301: determining a skin hue of a facial area in a portrait facial image.

In some embodiments, the skin hue of the facial area in the portrait facial image includes: cool, warm, and neutral. Based on color parameters of the facial area in the portrait facial image, a corresponding skin hue judgment coefficient is calculated. When the skin hue judgment coefficient is within a first preset interval, the skin hue is determined to be cool. When the skin hue judgment coefficient is within a second preset interval, the skin hue is determined to be warm. When the skin hue judgment coefficient is not within the first preset interval and not within the second preset interval, the skin hue is determined to be neutral.

In some embodiments, the portrait facial image is transformed from a RGB color space to a HSI color space; where H is hue, S is saturation (or chroma), and I is intensity (or brightness).

According to the hue H, saturation S and intensity I of the facial area in the portrait facial image, the mean, variance, maximum and minimum values of hue H are calculated. The mean and variance of saturation S are calculated.

In an eye area of the portrait facial image, by transforming the color of the eyeball area to Lab color space, the mean value of b in the eyeball area is calculated; where b is position coordinate between yellow and blue in the Lab color space. When b>0, it means that the color of this area is close to yellow, and the skin is warm.

In some embodiments, the calculation mode of the skin hue judgment coefficient is:

$$\xi_{stone} = \frac{\mu_H H_{max} \mu_S}{\sigma_H \sigma_S e^{\mu_b}(H_{max} - H_{min})};$$

where H is the hue of the facial area in the HSI color space. When H is greater than $1.5\pi$, H is reassigned to H-$2\pi$. In other cases, H takes its original value.

$\mu_H$ is the mean value of hue H in the facial area. $\mu_s$ is the mean value of saturation S in the facial area. $\mu_b$ is the mean value of b coordinate in the eyeball area. $\sigma_H$ is the variance of hue H in the face region. $\sigma_s$ is the variance of saturation S in the facial area. $H_{max}$ is the maximum value of hue H in the facial area. $H_{min}$ is the minimum value of hue H in the facial area.

When $\xi_{stone}$ is between $$\left[\frac{1}{3}\pi, \frac{2}{3}\pi\right],$$

the skin hue is determined to be cool. When $\xi_{stone}$ is between $$\left[-\frac{1}{6}\pi, \frac{1}{6}\pi\right],$$

the skin hue is determined to be warm. In other cases, the skin hue is determined to be neutral.

Step S302: determining a skin color number of the facial area in the portrait facial image.

In some embodiments, based on color parameters of the facial area in the portrait facial image, a corresponding skin color number judgment coefficient is calculated. The skin color number of the facial area is determined based on the skin color number judgment coefficient.

In some embodiments, the mean and variance of hue H are calculated in the HIS color space. The mean, variance, maximum and minimum values of intensity I are calculated in the HIS color space.

The calculation of the skin hue judgment coefficient is:

$$\eta_{level} = \frac{\mu_I \pi}{\sigma_H \sigma_I \mu_H (I_{max} - I_{min})};$$

where H is the hue of the facial area in the HSI color space. When H is greater than $1.5\pi$, H is reassigned to H-$2\pi$. In other cases, H takes its original value.

$\mu_I$ is the mean value of intensity I in the facial area. $\mu_H$ is the mean value of hue H in the facial area. $\sigma_H$ is the variance of hue H in the face region. $\sigma_I$ is the variance of intensity I in the facial area. $I_{max}$ is the maximum value of intensity I in the facial area. $I_{min}$ is the minimum value of intensity I in the facial area.

In some embodiments, the preset color number may include: a first color number, a second color number and a third color number.

When $\eta_{level}$<$TH_0$, the skin color number of the facial area is determined to be the first color number. When $\eta_{level}$>$TH_1$, the skin color number of the facial area is determined to be the third color number. In other cases, the skin color number of the facial area is determined to be the second color number. $TH_0$ and $TH_1$ are preset color number thresholds for distinguishing the color number.

Step S303: dividing all lipstick colors in a lipstick color sample library into intervals and configuring a correspondence between each lipstick color interval and a preset skin hue.

In some embodiments, all lipstick colors in the lipstick color sample library are divided into intervals according to a preset color matching coefficient and a correspondence between each lipstick color interval and a preset skin hue is configured. The preset skin hues includes: cool, warm and neutral.

In some embodiments, the preset color matching coefficient may be:

$$\Phi = \frac{\mu_L \eta_{level}}{\xi_{stone}(L_{max} - L_{min})};$$

where $\xi_{stone}$ is the skin hue judgment coefficient of the facial area. $\eta_{level}$ is the skin color number judgment coefficient of the facial area. $\mu_L$ is the mean value of the lightness L of the facial area in the Lab color space. $L_{max}$ is the maximum value of the lightness L of the facial area in the Lab color space. $L_{min}$ is the minimum value of the lightness L of the facial area in the Lab color space.

The lipstick colors in the lipstick color sample library are divided into intervals according to the color matching coefficient $\Phi$. The divided lipstick color intervals are from blue hue to yellow hue.

In some embodiments, the correspondence between each lipstick color interval and the preset skin hue may be:

cool hues are corresponding to the lipstick color interval of blue-green color scheme, warm hues are corresponding to the lipstick color interval of red-yellow color scheme, and neutral hues are corresponding to the lipstick color interval of all color schemes.

Step S304: finding a target lipstick color interval corresponding to the skin hue of the facial area based on the correspondence between each lipstick color interval and the preset skin hue.

In some embodiments, the lipstick color interval corresponding to the portrait facial image is found based on the skin hue of the facial area in the portrait facial image determined in the step S301 and the correspondence between each lipstick color interval and the preset skin hue determined in the step S303.

Step S305: selecting a corresponding lipstick color number in the target lipstick color interval based on the skin color number of the facial area.

In some embodiments, based on the skin color number of the facial area in the portrait facial image determined in the step S302, lipstick color numbers suitable for the degree of yellow and white skin color in the portrait facial image in some embodiments are selected from the lipstick color interval found in the step S304.

Figure 4:
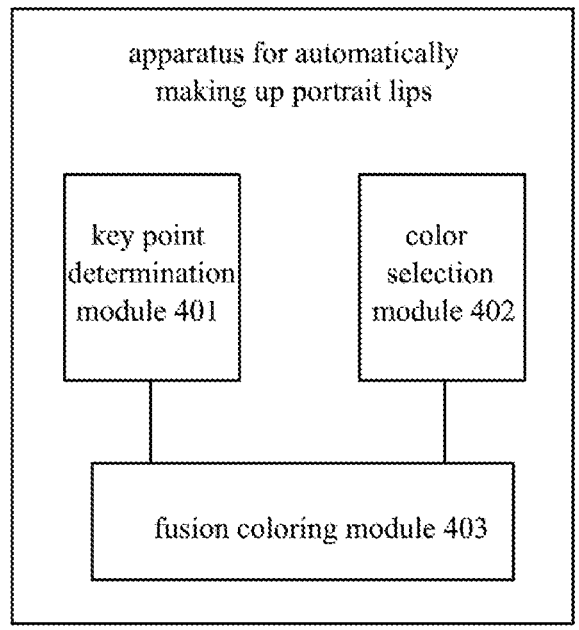
FIG. 4 is a structural block diagram of an apparatus for automatically making up portrait lips according to an embodiment of the present disclosure.

FIG. 4 is a structural block diagram of an apparatus for automatically making up portrait lips according to an embodiment of the present disclosure. As shown in FIG. 4, the apparatus includes: a key point determination module 401, a color selection module 402, and a fusion coloring module 403.

The key point determination module 401 is configured to extract lip key points from a portrait facial image, detect a portrait facial orientation and lip shape in the portrait facial image, and adjust positions of the lip key points based on the portrait facial orientation and the lip shape.

In some embodiments, the key point determination module 401 is further configured to: identify a facial contour and facial features in the portrait facial image, set key points for the portrait facial image, and extract the lip key points from all the key points; where the lip key points are used to describe lip image information.

In some embodiments, the key point determination module 401 is further configured to: determine whether to adjust the positions of the lip key points based on the lip shape and lip corner key points among the lip key points.

In some embodiments, the key point determination module 401 is further configured to, when the lip shape is closed or a degree of mouth opening is less than a first preset degree threshold, adjust the positions of the lip key points if the lip corner key points do not meet a first preset condition; where the first preset condition is that in a grayscale color space, brightness of pixel points in the middle of the lip corner key points is lower than a first preset threshold;

when the lip shape is open and a degree of mouth opening is larger than a second preset degree threshold, adjust the positions of the lip key points if the lip corner key points do not meet a second preset condition; where the first preset degree threshold is less than or equal to the second preset degree threshold; the second preset condition is that the lip corner key points are near an edge of a lip area and are not simultaneously located within a skin color area or a lip color area.

In some embodiments, the key point determination module 401 is further configured to, for side lip corner key points among the lip key points, when the portrait facial orientation is front-facing and the lip shape is closed, find two darkest pixel points in a front-facing adjustment area, and take a middle position of the two darkest pixel points as an adjusted position of the side lip corner key points; where the front-facing adjustment area is an area formed by extending a first preset number of pixel points around positions of the side lip corner key points;

perform edge detection on the front-facing adjustment area when the portrait facial orientation is front-facing and the lip shape is open; determine a first reference point according to a first edge detection result; by taking the first reference point as a center, find a first skin color boundary point and a first lip color boundary point in a skin color area and a lip color area, and take a middle position of the first skin color boundary point and the first lip color boundary point as an adjusted position of the side lip corner key points;

find a darkest pixel point in a side-leaning adjustment area when the portrait facial orientation is left-leaning or right-leaning and the lip shape is closed, and adjust positions of the side lip corner key points according to a relative position of the darkest pixel point in the side-leaning adjustment area; where the side-leaning adjustment area is an area formed by extending a second preset number of pixel points in left-right direction and a third preset number of pixel points in up-down direction from the positions of the side lip corner key points;

find a darkest pixel point in a side-leaning adjustment area when the portrait facial orientation is left-leaning or right-leaning and the lip shape is open, perform edge detection on the side-leaning adjustment area; determine a second reference point according to a second edge detection result; by taking the second reference point as a center, find a second skin color boundary point and a second lip color boundary point in a skin color area and a lip color area, and adjust positions of the side lip corner key points according to a relative position of the darkest pixel point in the side-leaning adjustment area, the second skin color boundary point and the second lip color boundary point.

The color selection module 402 is configured to detect a skin hue and a skin color number of a facial area in the portrait facial image, and select a target lipstick color from a lipstick color sample library based on the skin hue and the skin color number.

In some embodiments, the color selection module 402 is further configured to, calculate a corresponding skin hue judgment coefficient based on color parameters of the facial area in the portrait facial image; determine the skin hue to be cool when the skin hue judgment coefficient is within a first preset interval; determine the skin hue to be warm when the skin hue judgment coefficient is within a second preset interval; determine the skin hue to be neutral when the skin hue judgment coefficient is not within the first preset interval and not within the second preset interval; calculate a corresponding skin color number judgment coefficient based on color parameters of the facial area in the portrait facial image; determine the skin color number of the facial area based on the skin color number judgment coefficient.

In some embodiments, the color selection module 402 is further configured to, divide all lipstick colors in the lipstick color sample library into intervals according to a preset color matching coefficient, and configure a correspondence between each lipstick color interval and a preset skin hue; find a target lipstick color interval corresponding to the skin hue of the facial area based on the correspondence between each lipstick color interval and the preset skin hue; select a corresponding lipstick color number in the target lipstick color interval based on the skin color number of the facial area.

The fusion coloring module 403 is configured to perform fusion coloring by using the target lipstick color according to the positions of the lip key points.

In some embodiments, the fusion coloring module 403 is further configured to color the lip area in the portrait facial image based on the positions of the lip key points determined by the key point determination module 401 and the lipstick color number selected by the color selection module 402.

According to the apparatus for automatically making up portrait lips provided in the present embodiment, the lip key points are extracted from the portrait facial image, and the portrait facial orientation and lip shape are detected, and the positions of the lip key points are adjusted. Meanwhile, the skin hue and skin color number of the facial area in the portrait facial image are detected, and the target lipstick color is selected from the lipstick color sample library. Finally, fusion coloring is performed on the portrait lip according to the positions of the lip key points and the selected lipstick color. By using the technical solution provided by the present disclosure, based on the lip key points extracted from the portrait facial image, the facial orientation and lip shape of the portrait can be detected and the positions of the lip key points in the portrait can be adjusted. And changes of the positions of the key points caused by different facial orientations and lip shapes are corrected, so that the adjusted positions of the key points conform to the current facial orientation and lip shape of the portrait. And a suitable lipstick color is automatically selected to perform the fusion coloring on the portrait lip based on the detected skin hue and skin color number. This effectively solves problems of inaccurate coloring position caused by the inability to adjust the key points when the facial orientation and lip shape change. And by automatically selecting the lipstick color, a user's operation steps are simplified, that is, makeup effect is optimized. Meanwhile, operation difficulty is reduced and user experience is effectively improved.

One embodiment of the present disclosure further provides a non-volatile computer storage medium. The computer storage medium stores therein an executable instruction for causing the processor to perform the steps of the method for automatically making up portrait lips according to any of the foregoing method embodiments.

Figure 5:
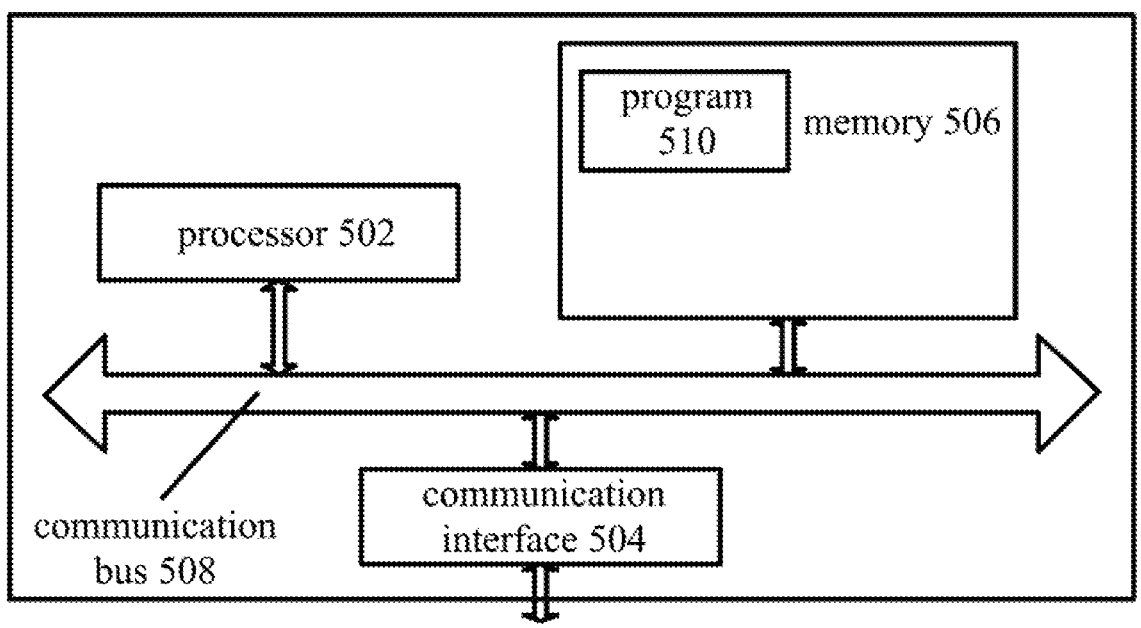
FIG. 5 is a schematic diagram of a computing device according to an embodiment of the present disclosure.

FIG. 5 is a schematic diagram of a computing device according to an embodiment of the present disclosure. The embodiments of the present disclosure do not limit the implementation of the computing device.

As shown in FIG. 5, the computing device may include: a processor 502, a communication interface 504, a memory 506 and a communication bus 508.

The processor 502, the communication interface 504 and the memory 506 communicate with each other through the communication bus 508.

The communication interface 504 is configured to communicate with other devices such as network elements such as clients or other servers.

The processor 502 is configured to execute a program 510 to execute the relevant steps in the method embodiments of the above method for automatically making up portrait lips.

In some embodiments, the program 510 may include program codes, and the program codes include a computer operation instruction.

The processor 502 may be a central processing unit (CPU), or an application specific integrated circuit (ASIC), or one or more integrated circuits configured to implement the embodiments of the present disclosure. The one or more processors included in the computing device may be the same type of processors, such as one or more CPUs, or may also be different types of processors, such as one or more CPUs and one or more ASICs.

The memory 506 is configured to store the program 510. The memory 506 may include a high-speed RAM memory, and may also include a non-volatile memory such as a disk memory.

The program 510 is configured to enable the processor 502 to perform the method for automatically making up portrait lips according to any of the foregoing method embodiments. The implementation of each step in the program 510 may refer to the corresponding description of the corresponding steps and units in the embodiment of the method for automatically making up portrait lips. A person skilled in the art may clearly understand that for the purpose of convenient and brief description, specific working process of the foregoing device and modules may refer to the description of the corresponding process in the foregoing method embodiment.

One embodiment of the present disclosure provides a computer program product, including computer-readable codes. When the computer-readable code is executed on an electronic device, a processor in the electronic device performs the steps of the method for automatically making up portrait lips according to any of the foregoing method embodiments.

The algorithms and displays provided here are not inherently related to any particular computer, virtual system or other equipment. Various general-purpose systems can also be used based on the teaching here. Based on the above description, the structure required to construct this type of system is obvious. In addition, the present disclosure is not directed to any specific programming language. It is to be understood that various programming languages can be used to implement the content of the present disclosure described herein, and the above description of a specific language is for the purpose of disclosing the best embodiment of the present disclosure.

In the specification provided here, a lot of specific details are explained. However, it is to be understood that the embodiments of the present disclosure may be practiced without these specific details. In some instances, well-known methods, structures, and technologies are not shown in detail, so as not to obscure the understanding of this specification.

Similarly, it is to be understood that in order to simplify the present disclosure and help understand one or more of the various disclosed aspects, in the above description of the exemplary embodiments of the present disclosure, the various features of the present disclosure are sometimes grouped together into a single embodiment, figure, or its description. However, the disclosed method should not be interpreted as reflecting the intention that the claimed disclosure requires more features than those explicitly recorded in each claim. More precisely, as reflected in the following claims, the disclosure aspect lies in less than all the features of a single embodiment previously disclosed. Therefore, the claims following the specific embodiment are thus explicitly incorporated into the specific embodiment, where each claim itself serves as a separate embodiment of the present disclosure.

Those skilled in the art can understand that it is possible to adaptively change the modules in the device in the embodiment and set them in one or more devices different from the embodiment. The modules or units or components in the embodiments can be combined into one module or unit or component, and in addition, they can be divided into multiple sub-modules or sub-units or sub-components. Except that at least some of such features and/or processes or units are mutually exclusive, any combination can be used to combine all the features disclosed in this specification (including the accompanying claims, abstract and drawings) and any method or device thus disclosed. Unless expressly stated otherwise, each feature disclosed in this specification (including the accompanying claims, abstract and drawings) may be replaced by an alternative feature providing the same, equivalent or similar purpose.

In addition, those skilled in the art can understand that although some embodiments herein include certain features included in other embodiments but not other features, the combination of features of different embodiments means that they are within the scope of the present disclosure and form different embodiments. For example, in the following claims, any one of the claimed embodiments can be used in any combination.

The various component embodiments of the present disclosure may be implemented in hardware, or implemented as software modules running on one or more processors, or in combination thereof. It will be appreciated by those skilled in the art that some or all of the functions of some or all of the components of the present disclosure may be implemented using a microprocessor or a digital signal processor (DSP) in practice in accordance with an embodiment of the present disclosure. The present disclosure may also be implemented as a part or all of the devices or device programs (e.g., computer programs and computer program products) for performing the methods described herein. Such a program for implementing the present disclosure may be stored on a computer-readable medium or may have the form of one or more signals. Such signals may be downloaded from an internet web site, or on a carrier signal or in any other form.

It is to be noted that the above-mentioned embodiments illustrate rather than limit the present disclosure, and those skilled in the art can design alternative embodiments without departing from the scope of the appended claims. In the claims, any reference numbers placed between parentheses should not be constructed as a limitation to the claims. The word "comprising" does not exclude the presence of elements or steps not listed in the claims. The word "a" or "an" preceding an element does not exclude the presence of multiple such elements. The present disclosure can be realized by means of hardware including several different elements and by means of a suitably programmed computer. In the unit claims enumerating several devices, several of these devices may be embodied in the same hardware item. In the unit claims enumerating several devices, several of these devices may be embodied in the same hardware item. The use of the words first, second, and third, etc. do not indicate any order. These words can be interpreted as names.

INDUSTRIAL APPLICABILITY

By extracting lip key points from a portrait facial image and adjusting positions of the lip key points based on the detected portrait facial orientation and lip shape, the accuracy of positions of the adjusted lip key points is ensured. Then, according to the detected skin hue and skin color number of the facial image, a suitable lipstick color is automatically selected and colored. This solves the problem of inaccurate key point position and makeup defects in the related art when the lighting and angle of the portrait change, which is based on curve fitting and coloring according to the facial detection key points. At the same time, the user's step of choosing lipstick color by themselves is saved. Automatically selecting lipstick color and coloring according to the corresponding conditions is more in line with human aesthetics and improves the efficiency of makeup and user experience.

What is claimed is:

1. A method for automatically making up portrait lips, comprising:

extracting lip key points from a portrait facial image and detecting a portrait facial orientation and a lip shape in the portrait facial image; adjusting positions of the lip key points based on the portrait facial orientation and the lip shape;

detecting a skin hue and a skin color number of a facial area in the portrait facial image;

and selecting a target lipstick color from a lipstick color sample library based on the skin hue and the skin color number; and, performing fusion coloring by using the target lipstick color according to the positions of the lip key points;

wherein the adjusting positions of the lip key points based on the portrait facial orientation and the lip shape, includes:

for side lip corner key points in the lip key points, when the portrait facial orientation is front-facing and the lip shape is closed, finding two darkest pixel points in a front-facing adjustment area, and taking a middle position between the two pixel points as an adjusted position of the side lip corner key points; wherein the front-facing adjustment area is an area formed by extending a first preset number of pixel points around positions of the side lip corner key points;

when the portrait facial orientation is front-facing and the lip shape is open, performing edge detection on the front-facing adjustment area, and determining a first reference point according to a first edge detection result; by taking the first reference point as a center, finding a first skin color boundary point and a first lip color boundary point in a skin color area and a lip color area; and taking a middle position between the first skin color boundary point and the first lip color boundary point as an adjusted position of the side lip corner key points;

when the portrait facial orientation is left-leaning or right-leaning and the lip shape is closed, finding a darkest pixel point in a side-leaning adjustment area and adjusting positions of the side lip corner key points according to a relative position of the darkest pixel in the side-leaning adjustment area; wherein the side-leaning adjustment area is an area formed by extending a second preset number of pixel points in left-right directions and a third preset number of pixel points in up-down directions from the positions of the side lip corner key points;

when the portrait facial orientation is left-leaning or right-leaning and the lip shape is open, finding a darkest pixel point in the side-leaning adjustment area, performing edge detection on the side-leaning adjustment area, and determining a second reference point according to a second edge detection result; by taking the second reference point as a center, finding a second skin color boundary point and a second lip color boundary point in a skin color area and a lip color area, and adjusting positions of the side lip corner key points according to a relative position of the darkest pixel point in the side-leaning adjustment area, the second skin color boundary point and the second lip color boundary point.

2. The method according to claim 1, wherein the detecting a skin hue and a skin color number of a facial area in the portrait facial image, includes:

calculating a corresponding skin hue judgment coefficient based on color parameters of the facial area in the portrait facial image; determining the skin hue to be cool when the skin hue judgment coefficient is within a first preset interval; determining the skin hue to be warm when the skin hue judgment coefficient is within a second preset interval; and determining the skin hue to be neutral when the skin hue judgment coefficient is not within the first preset interval and not within the second preset interval;

calculating a corresponding skin color number judgment coefficient based on the color parameters of the facial area in the portrait facial image; and determining the skin color number of the facial area based on the skin color number judgment coefficient.

3. The method according to claim 1, wherein the selecting a target lipstick color from a lipstick color sample library based on the skin hue and the skin color number, includes:

dividing all lipstick colors in the lipstick color sample library into intervals according to a preset color matching coefficient, and configuring a correspondence between each lipstick color interval and a preset skin hue;

finding a target lipstick color interval corresponding to the skin hue of the facial area based on the correspondence between each lipstick color interval and the preset skin hue; and selecting a corresponding lipstick color number in the target lipstick color interval based on the skin color number of the facial area.

4. A computing device, comprising: a processor, a memory, a communication interface, and a communication bus; wherein the processor, the memory, and the communication interface communicate with each other through the communication bus;

the memory is configured to store an executable instruction that causes the processor to perform:

extracting lip key points from a portrait facial image and detecting a portrait facial orientation and a lip shape in the portrait facial image; adjusting positions of the lip key points based on the portrait facial orientation and the lip shape;

detecting a skin hue and a skin color number of a facial area in the portrait facial image; and selecting a target lipstick color from a lipstick color sample library based on the skin hue and the skin color number; and, performing fusion coloring by using the target lipstick color according to the positions of the lip key points;

wherein when adjusting positions of the lip key points based on the portrait facial orientation and the lip shape, the processor is configured to perform:

for side lip corner key points in the lip key points, when the portrait facial orientation is front-facing and the lip shape is closed, finding two darkest pixel points in a front-facing adjustment area, and taking a middle position between the two pixel points as an adjusted position of the side lip corner key points; wherein the front-facing adjustment area is an area formed by extending a first preset number of pixel points around positions of the side lip corner key points;

when the portrait facial orientation is front-facing and the lip shape is open, performing edge detection on the front-facing adjustment area, and determining a first reference point according to a first edge detection result; by taking the first reference point as a center, finding a first skin color boundary point and a first lip color boundary point in a skin color area and a lip color area; and taking a middle position between the first skin color boundary point and the first lip color boundary point as an adjusted position of the side lip corner key points;

when the portrait facial orientation is left-leaning or right-leaning and the lip shape is closed, finding a darkest pixel point in a side-leaning adjustment area and adjusting positions of the side lip corner key points according to a relative position of the darkest pixel in the side-leaning adjustment area; wherein the side-leaning adjustment area is an area formed by extending a second preset number of pixel points in left-right directions and a third preset number of pixel points in up-down directions from the positions of the side lip corner key points;

when the portrait facial orientation is left-leaning or right-leaning and the lip shape is open, finding a darkest pixel point in the side-leaning adjustment area, performing edge detection on the side-leaning adjustment area, and determining a second reference point according to a second edge detection result; by taking the second reference point as a center, finding a second skin color boundary point and a second lip color boundary point in a skin color area and a lip color area, and adjusting positions of the side lip corner key points according to a relative position of the darkest pixel point in the side-leaning adjustment area, the second skin color boundary point and the second lip color boundary point.

5. A non-transitory computer storage medium, comprising: an executable instruction stored thereon; wherein the executable instruction, when executed by a processor, causes the processor to perform:

extracting lip key points from a portrait facial image and detecting a portrait facial orientation and a lip shape in the portrait facial image; adjusting positions of the lip key points based on the portrait facial orientation and the lip shape;

detecting a skin hue and a skin color number of a facial area in the portrait facial image; and selecting a target lipstick color from a lipstick color sample library based on the skin hue and the skin color number; and, performing fusion coloring by using the target lipstick color according to the positions of the lip key points;

wherein when adjusting positions of the lip key points based on the portrait facial orientation and the lip shape, the executable instruction, when executed by the processor, causes the processor to perform:

for side lip corner key points in the lip key points, when the portrait facial orientation is front-facing and the lip shape is closed, finding two darkest pixel points in a front-facing adjustment area, and taking a middle position between the two pixel points as an adjusted position of the side lip corner key points; wherein the front-facing adjustment area is an area formed by extending a first preset number of pixel points around positions of the side lip corner key points;

when the portrait facial orientation is front-facing and the lip shape is open, performing edge detection on the front-facing adjustment area, and determining a first reference point according to a first edge detection result; by taking the first reference point as a center, finding a first skin color boundary point and a first lip color boundary point in a skin color area and a lip color area; and taking a middle position between the first skin color boundary point and the first lip color boundary point as an adjusted position of the side lip corner key points;

when the portrait facial orientation is left-leaning or right-leaning and the lip shape is closed, finding a darkest pixel point in a side-leaning adjustment area and adjusting positions of the side lip corner key points according to a relative position of the darkest pixel in the side-leaning adjustment area; wherein the side-leaning adjustment area is an area formed by extending a second preset number of pixel points in left-right directions and a third preset number of pixel points in up-down directions from the positions of the side lip corner key points;

when the portrait facial orientation is left-leaning or right-leaning and the lip shape is open, finding a darkest pixel point in the side-leaning adjustment area, performing edge detection on the side-leaning adjustment area, and determining a second reference point according to a second edge detection result; by taking the second reference point as a center, finding a second skin color boundary point and a second lip color boundary point in a skin color area and a lip color area, and adjusting positions of the side lip corner key points according to a relative position of the darkest pixel point in the side-leaning adjustment area, the second skin color boundary point and the second lip color boundary point.

\* \* \* \* \*